US008616649B2

(12) United States Patent
Uramichi et al.

(10) Patent No.: US 8,616,649 B2
(45) Date of Patent: Dec. 31, 2013

(54) PIVOTAL DEVICE OF VEHICLE SEAT

(75) Inventors: Hideki Uramichi, Toyota (JP); Takayuki Endou, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/551,009

(22) Filed: Jul. 17, 2012

(65) Prior Publication Data

US 2013/0026808 A1 Jan. 31, 2013

(30) Foreign Application Priority Data

Jul. 26, 2011 (JP) ................................ 2011-162905

(51) Int. Cl.
*B60N 2/235* (2006.01)

(52) U.S. Cl.
USPC .................................... 297/367 P; 297/367 R

(58) Field of Classification Search
USPC .................... 297/366, 367 P, 367 R, 368, 369
See application file for complete search history.

(56) References Cited

U.S. PATENT DOCUMENTS

| | | | | |
|---|---|---|---|---|
| 4,789,205 A * | 12/1988 | Pipon et al. | ............... | 297/367 R |
| 5,857,746 A * | 1/1999 | Barrere et al. | ........... | 297/367 R |
| 7,766,429 B2 | 8/2010 | Kuroda et al. | | |
| 7,950,742 B2 | 5/2011 | Endo et al. | | |

FOREIGN PATENT DOCUMENTS

| | | |
|---|---|---|
| JP | 2008-506481 | 3/2008 |
| WO | 2006/010406 | 2/2006 |

OTHER PUBLICATIONS

U.S. Appl. No. 13/514,128 to Takayuki Endo et al., which was filed on Jun. 6, 2012.

* cited by examiner

*Primary Examiner* — Sarah B McPartlin
(74) *Attorney, Agent, or Firm* — Greenblum & Bernstein, P.L.C.

(57) ABSTRACT

A pivotal device of a vehicle seat includes ratchet and guide mounted together to be rotatable relative to each other, and pawls supported by the guide in its circumferential direction and having external teeth adapted to mesh with internal teeth of the ratchet when an operating cam pushes the pawls radially outward, so as to inhibit relative rotation of the ratchet and the guide. One of the pawls is divided obliquely into two parts in the circumferential direction, and is pushed radially outward to mesh with the ratchet while increasing its width and eliminating clearances between the pawl and the guide. The rotating cam rides on a protrusion formed on the guide during rotation thereof, so as to largely push the pawls and press the ratchet radially against the guide.

4 Claims, 11 Drawing Sheets

4
70
73
71
72
74
10(2f)
13b
12
13a
11
14
12a
12b
30(30A)
30A2
32
30
30a
31
44
42
40
41a
41
30A1
50
51
52
20(3f)
21
21b
23b(23)
23a(23)
24a
21d
22
25
da
24b
21a
62
60
61
21c
ca

30A1c
30A2c
30A1
30A2b
30A2
30A1b
30A2a
30A1a
30A1
4
31
30(30A)
30a
23a(23)
22
30A2
32
32
21a
12(10)
21b
20
32
B
42
30
42
12a
44
23a(23)
32
50
44
30a
41
44
31
23a(23)
30a
31
44
52
42
32
30
42
41a
32
23b(23)
21d
21c
12b
40
ca
24b
da

PIVOTAL DEVICE OF VEHICLE SEAT

INCORPORATION BY REFERENCE

The disclosure of Japanese Patent Application No. 2011-162905 filed on Jul. 26, 2011 including the specification, drawings and abstract is incorporated herein by reference in its entirety.

BACKGROUND OF THE INVENTION

1. Field of the Invention

The invention relates to a pivotal device of a vehicle seat. More particularly, the invention relates to a pivotal device of a vehicle seat, which connects two members that constitute the vehicle seat such that the two members are rotatable relative to each other, and has a function of locking or inhibiting rotation of the two members.

2. Description of Related Art

A known example of pivotal device (reclining device) that connects a seat back of a vehicle seat with a seat cushion such that the angle of the seat back relative to the seat cushion is adjustable is disclosed in Japanese Patent Application Publication No. 2008-506481 (JP 2008-506481 A). The reclining device has a disc-shaped ratchet joined integrally to the seat back, and a disc-shaped guide joined integrally to the seat cushion, and the ratchet and the guide are assembled together in the axial direction to be rotatable relative to each other, and are prevented from being detached from each other in the axial direction by a ring-shaped outer holding member mounted over the outer peripheries of the ratchet and the guide.

The ratchet and the guide are locked, or inhibited from rotating relative to each other, when pawls set on the guide and having external teeth are moved radially outward so as to mesh with internal teeth formed in a radially outer portion of the ratchet. More specifically, the pawls are provided at two or more positions in the circumferential direction of the guide, and one of the pawls is divided into two or more parts at an oblique angle(s) with respect to the circumferential direction. As the pawl is pushed outward in a radial direction of the ratchet, the width of the pawl as measured in the circumferential direction increases, so that clearances between the pawl and the guide in the circumferential direction are eliminated, and the pawl is brought into meshing engagement with the inner teeth of the ratchet with no clearances left between the pawl and the guide. As a result, the ratchet and the guide are placed in the locked state in a condition where they are inhibited from moving relative to each other in the circumferential direction.

Although the ratchet and the guide are inhibited from moving relative to each other in the circumferential direction according to the technology disclosed in JP 2008-50641 A, relative movement of the ratchet and the guide in radial directions due to clearances formed between the ratchet and the guide upon mounting thereof cannot be prevented.

SUMMARY OF THE INVENTION

The invention provides a pivotal device of a vehicle seat, which is free from relative movements of a ratchet and a guide in circumferential and radial directions thereof when the pivotal device is placed in a locked state in which the ratchet and the guide are inhibited from rotating relative to each other.

According to one aspect of the invention, a pivotal device of a vehicle seat having a lock mechanism includes disc-shaped ratchet and guide, a plurality of pawls, and an operating cam. The ratchet and guide are axially fitted on and mounted to each other, such that the ratchet and the guide radially support each other while being rotatable relative to each other. The plurality of pawls are supported by the guide in a circumferential direction of the guide, and each of the pawls has external teeth adapted to mesh with internal teeth formed in a radially outer portion of the ratchet as the pawls move outward in radial directions of the guide, so as to inhibit the ratchet and the guide from rotating relative to each other. The operating cam is operable to push the plurality of pawls radially outward, relative to the guide. At least one of the pawls is divided obliquely into a first part and a second part in the circumferential direction, and the first and second parts are adapted to move in opposite circumferential directions when the operating cam pushes the pawl radially outward, so that the pawl increases its width and is brought into meshing engagement with the internal teeth of the ratchet while eliminating clearances in the circumferential direction between the pawl and the guide. A protrusion is formed on the guide, and the operating cam is arranged to ride on the protrusion during movement thereof to push the pawls radially outward, so that reaction force is applied to the pawl so as to push the pawl to an overshoot position located radially outwardly of a position at which the pawl meshes with the internal teeth, and the ratchet is pressed radially against the guide.

According to the above aspect of the invention, at least one of the pawls is divided obliquely into two parts in the circumferential direction. In operation, the operating cam pushes the pawl outward so as to eliminate clearances between the pawl and the guide in the circumferential direction. In this condition, the pawl is brought into meshing engagement with the internal teeth of the ratchet, so that the ratchet and the guide are inhibited from moving relative to each other in the circumferential direction when they are locked or inhibited from rotating. Also, the operating cam rides on the protrusion formed on the guide during movement thereof to push the pawls outward, so as to produce reaction force with which the above-indicated at least one pawl is pushed outward to the overshoot position, and the ratchet is pressed radially against the guide, resulting in a condition where the ratchet and the guide are inhibited from moving relative to each other in radial directions. Thus, the ratchet and the guide are inhibited from moving relative to each other in the circumferential and radial directions when they are in the locked state.

In the pivotal device according to the above aspect of the invention, the protrusion may be formed on the guide at a position opposite to a circumferential location of the above-indicated at least one pawl, with the operating cam interposed between the pawl and the protrusion, so that an outer peripheral portion of the operating cam rides on the protrusion during movement of the operating cam.

In the pivotal device as described above, the protrusion of the guide is formed at the position opposite to the above-indicated at least one pawl that is pushed outward to the overshoot position, with the operating cam interposed between the protrusion and the pawl in question. With this arrangement, force with which the at least one pawl is pushed outward to the overshoot position can be appropriately applied from the protrusion to the operating cam.

In the pivotal device according to the above aspect of the invention, the operating cam may be supported on a central portion of the guide to be rotatable about an axis thereof, and may be arranged to rotate so as to push the pawls radially outward. The pawls may include two pawls located adjacent to each other in the circumferential direction and adapted to be pushed outward to the overshoot positions by the operating cam. The protrusion formed on the guide may include a protrusion that is formed within a region that is symmetric to a circumferential region between the two pawls with respect to the central portion of the guide, so that an outer peripheral portion of the operating cam rides on the protrusion during movement of the operating cam.

With the above arrangement, the two pawls located adjacent to each other in the circumferential direction are pushed outward to the overshoot positions, so that the ratchet is pressed radially against the guide. As a result, the ratchet is pressed at two circumferential points thereof against the guide with high stability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Some embodiments of the invention will be described with reference to the drawings.

Figure 1:
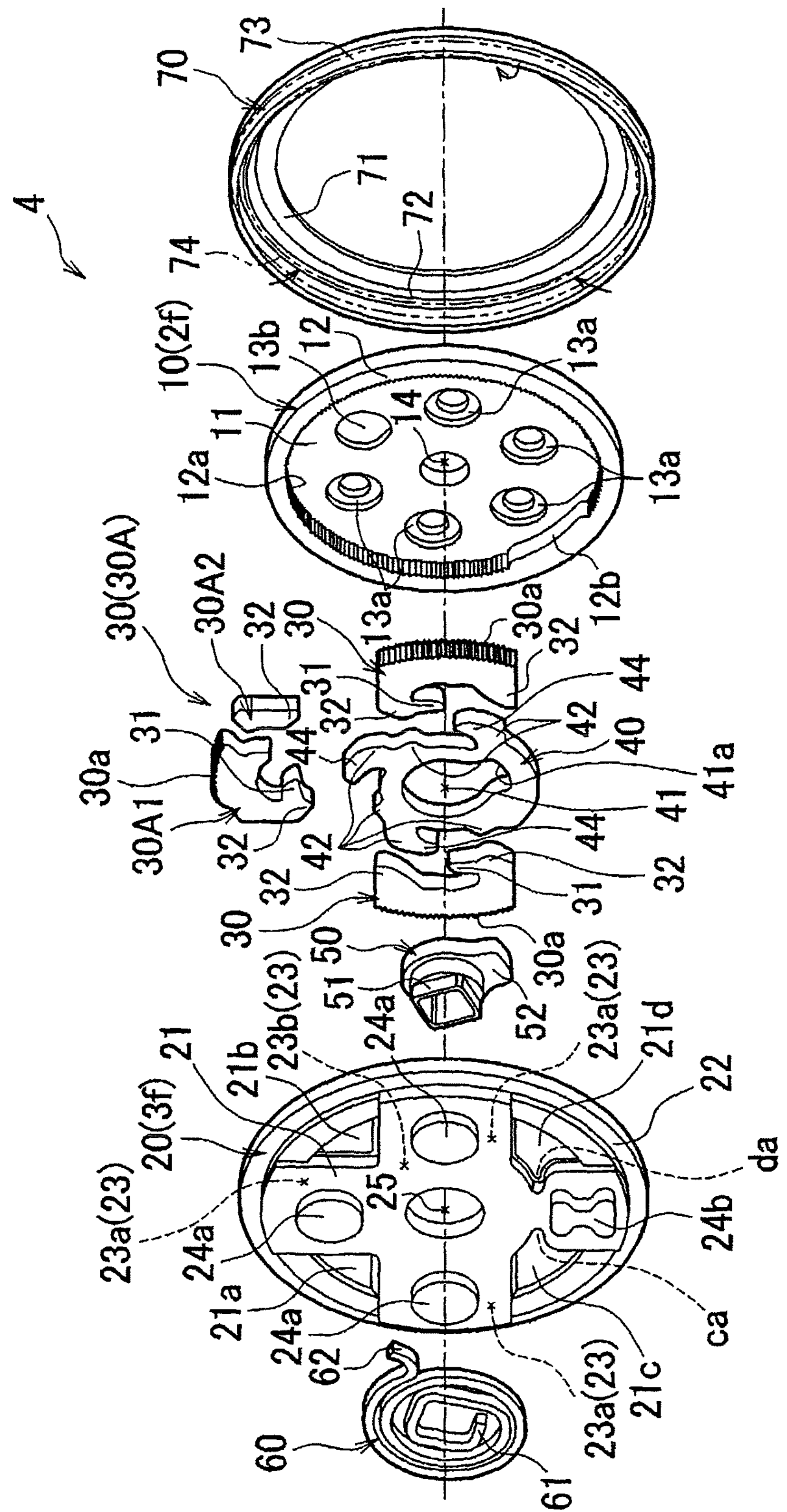
FIG. 1 is an exploded perspective view showing the construction of a pivotal device of a vehicle seat in the form of a reclining device according to a first embodiment of the invention.
Figure 2:
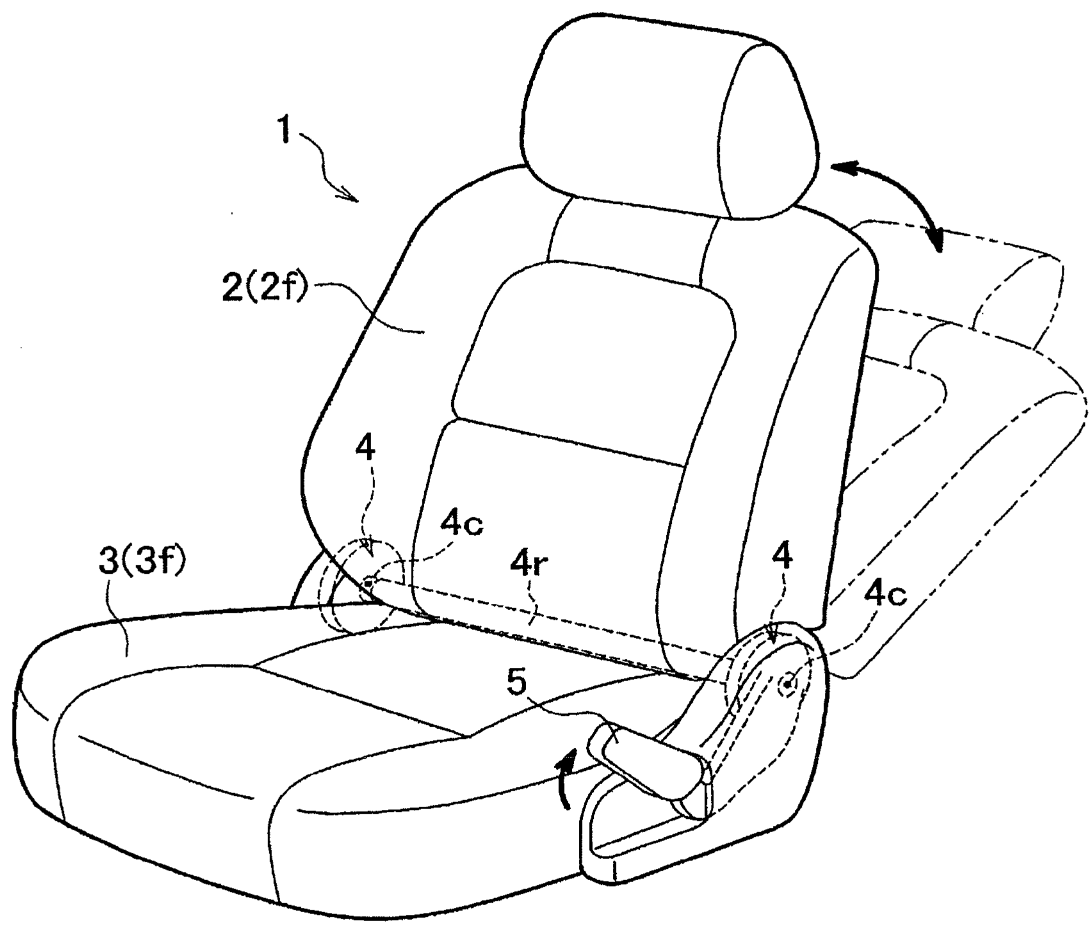
FIG. 2 is a perspective view showing the outer appearance of the vehicle seat.

Initially, the construction of a pivotal device of a vehicle seat according to a first embodiment of the invention will be described with reference to FIG. 1 through FIG. 8. As shown in FIG. 2, the pivotal device of the vehicle seat of this embodiment is constructed in the form of reclining devices 4, 4 that connect a seat back 2 and a seat cushion 3 of the vehicle seat 1 such that the angle of the seat back 2 relative to the seat cushion 3 can be adjusted. More specifically, the reclining devices 4, 4 are interposed between lower end portions of right and left sides of a seat back frame **2*f* that forms a framework of the seat back 2, and rear end portions of right and left sides of a seat cushion frame 3*f* that forms a framework of the seat cushion 3, so as to connect each side portion of the seat back frame 2*f* with a corresponding side portion of the seat cushion frame 3*f* such that these side portions are rotatable relative to each other about the same axis. With this arrangement, the seat back 2 is connected with the seat cushion 3 such that the angle of the seat back 2 relative to the seat cushion 3 (which will also be called "reclining angle" can be adjusted in the longitudinal direction of the seat. Each of the reclining devices 4, 4 incorporates a locking structure, which is operable to switch the reclining device 4 between an unlocked state in which the reclining angle of the seat back 2** can be changed, and a locked state in which the reclining angle is fixed.

More specifically, the reclining devices 4, 4 are arranged to be switched between the locked state and the unlocked state, in accordance with rotation of operating shafts **4*c*, 4*c* that are inserted through central portions of the reclining devices 4, 4. The operating shafts 4*c*, 4*c* are connected to each other via a connecting rod 4*r*, so that the switching operations of the right and left reclining devices 4, 4 are performed at the same time in synchronism with each other. The reclining devices 4, 4 are normally held in the locked state by means of spring biasing structures (which will be described later), such that the reclining angle of the seat back 2 is fixed. A release lever 5 is provided on the outer side (the right-hand side on the paper of FIG. 2) of the seat cushion 3 as viewed in the vehicle width direction. When the release lever 5 is pulled up, the operating shafts 4*c*, 4*c* are rotated about their axes at the same time, and the reclining devices 4, 4 are released from the locked state in which the reclining angle of the seat back 2 is fixed. While the release lever 5 is being pulled up, the reclining angle of the seat back 2 can be freely adjusted. When the releasing operation is stopped, i.e., when the release lever 5 is released, the spring biasing structures turn the reclining devices 4, 4 back into the locked state in which the reclining angle of the seat back 2** is fixed.

Springs (not shown) for biasing the seat back 2 forward of the seat all the time are respectively mounted between the side portions of the seat back frame **2*f* and the side portions of the seat cushion frame 3*f*. When the reclining device 4, 4 are released from the locked state in which the reclining angle of the seat back 2 is fixed, the seat back 2 rises up to a position at which the seat back 2 touches the back of a seated passenger, under the bias force of the springs, and follows the movement of the back of the seated passenger who tilts his/her upper body back and forth so that the reclining angle can be freely varied. In a condition where the seat back 2 is within an angular range over which the seat back 2 is inclined rearward of the seat from the position at which the seat back 2 stands upright, if the release lever 5 stops being operated, or the release lever 5 is released, the seat back 2 is brought back into the state in which the reclining angle is fixed, in other words; the reclining devices 4, 4 are brought back into the locked state. In a condition where the seat back 2 is within an angular range over which the seat back 2 is inclined forward of the seat from the upright position, the seat back 2 is not brought back into the state in which the reclining angle is fixed, i.e., the reclining devices 4, 4 are not brought back into the locked state, even if the release lever 5** is released.

The former angular range in which the seat back 2 is brought back into the state in which the reclining angle is fixed corresponds to a rotation range or region called "lock zone" set in each of the reclining devices 4, 4, and the latter angular range in which the seat back 2 is not brought back into the locked state in which the reclining angle is fixed corresponds to a rotation range or region called "free zone" set in each of the reclining devices 4, 4. If the release lever 5 is operated in a condition where no person sits in the vehicle seat 1, the seat back 2 tilts forward under the bias force of the springs, beyond the upright position thereof. With the free zones thus set in the reclining devices 4, 4, once the seat back 2 goes beyond the upright position while tilting forward, the seat back 2 falls onto the upper surface of the seat cushion 3 and the seat is placed in a folded state even if the release lever 5 is released.

In the following, the construction of the reclining devices 4, 4 as described above will be described in greater detail. Since the reclining devices 4, 4, which are symmetric with respect to the centerline of the seat, have the same construction, the construction of only one of the reclining devices 4 which is depicted on the right-hand side on the paper of FIG. 2 and located on the outer side of the seat as viewed in the vehicle width direction will be described. As shown in FIG. 1, the reclining device 4 has disc-shaped ratchet 10 and guide 20, three pawls 30, a rotating cam 40, a hinge cam 50, a coil spring 60, and an outer ring 70, which are assembled together in an axial direction, to provide a single assembly. In this embodiment, the rotating cam 40 functions as the "operating cam" of the invention.

The ratchet 10 has a disc portion 11, and a cylindrical portion 12 formed on an outer peripheral portion of the disc portion 11 so as to protrude in a cylindrical shape in a thickness portion in which the ratchet 10 is mounted onto the guide 20. The cylindrical portion 12 is formed by extruding the outer peripheral portion of the disc portion 11 in the thickness direction by half blanking. The cylindrical portion 12 is formed at its inner circumferential surface with an inner circumferential tooth face 12*a* having internal teeth arranged to mesh with external teeth on outer tooth faces 30*a* of the respective pawls 30 (which will be described later), and an uplifted face 12*b* that protrudes from the inner circumferential tooth face 12*a* to form a smooth arcuate face having no internal teeth. The inner circumferential tooth face 12*a* and the uplifted face 12*b* are arranged in the circumferential direction. The uplifted face 12*b* is formed at one circumferential location on the inner circumferential surface of the cylindrical portion 12, and the inner circumferential surface of the uplifted face 12*b* is formed as an arcuate face that protrudes radially inwardly of the tips of the internal teeth on the inner circumferential tooth face 12*a*.

Figure 3:
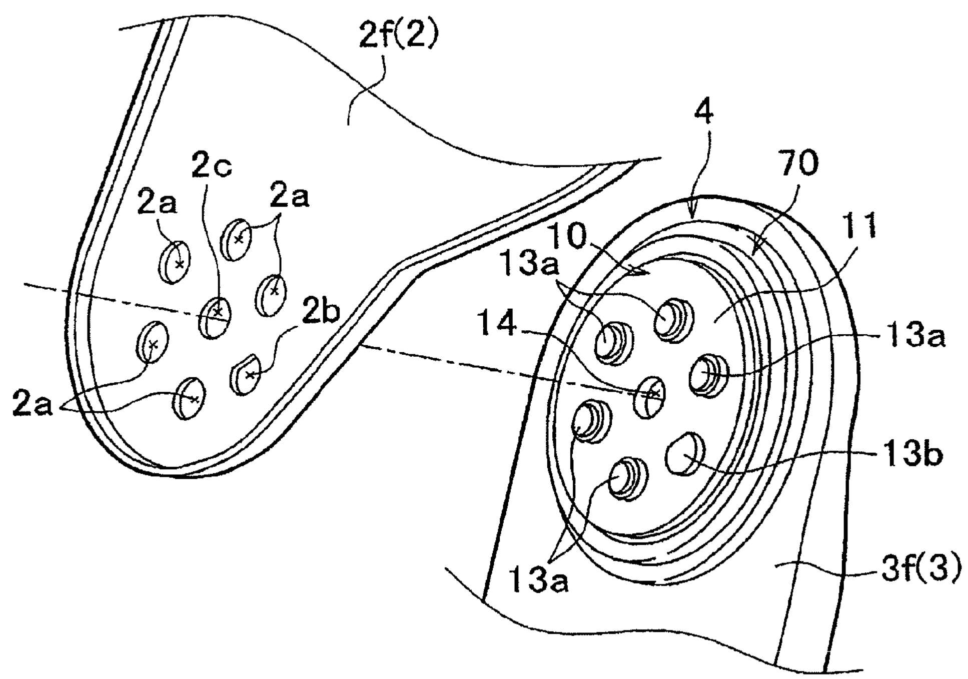
FIG. 3 is a perspective view showing a joining structure of a seat back frame and the reclining device.

As shown in FIG. 3, an outer major surface (on the left-hand side in FIG. 3) of the disc portion 11 of the ratchet 10 is joined to and integrally connected with an outer plate surface of the seat back frame 2*f*. More specifically, the disc portion 11 of the ratchet 10 is formed with five dowels 13*a* and one D-shaped dowel 13*b* that protrude in a cylindrical shape from the outer major surface of the disc portion 11. The dowels 13*a* and D-shaped dowel 13*b* are arranged at equal intervals in the circumferential direction, at positions relatively close to the outer periphery of the disc portion 11. Of these dowels 13*a*, 13*b*, the D-shaped dowel 13*b* is formed in the shape of letter "D" in cross-section, by cutting a part of a cylindrical dowel that protrudes from the disc portion 11, so as to be distinct in shape from the dowels 13*a* that protrude in a cylindrical shape.

On the other hand, the seat back frame 2*f* is formed with dowel holes 2*a* and one D-shaped dowel hole 2*b* into which the dowels 13*a* and D-shaped dowel 13*b* as described above are respectively fitted in the axial direction. The dowel holes 2*a* and D-shaped dowel hole 2*b* are formed through the thickness of the seat back frame 2*f*. By fitting the dowels 13*a* and D-shaped dowel 13*b* into the dowel holes 2*a* and D-shaped dowel hole 2*b* formed in the seat back frame 2*f*, and joining the fitting portions by welding, the ratchet 10 is firmly and integrally connected to the seat back frame 2*f* (see FIG. 5). As shown in FIG. 1, a through-hole 14 through which the operating shaft 4*c* (see FIG. 2) of the reclining device 4 is inserted is formed in a central portion of the disc portion 11 of the ratchet 10. Also, as shown in FIG. 3, a through-hole 2*c* having the same function as the through-hole 14 is formed through the seat back frame 2*f*, at a position on the same axis as that of the through-hole 14.

Figure 5:
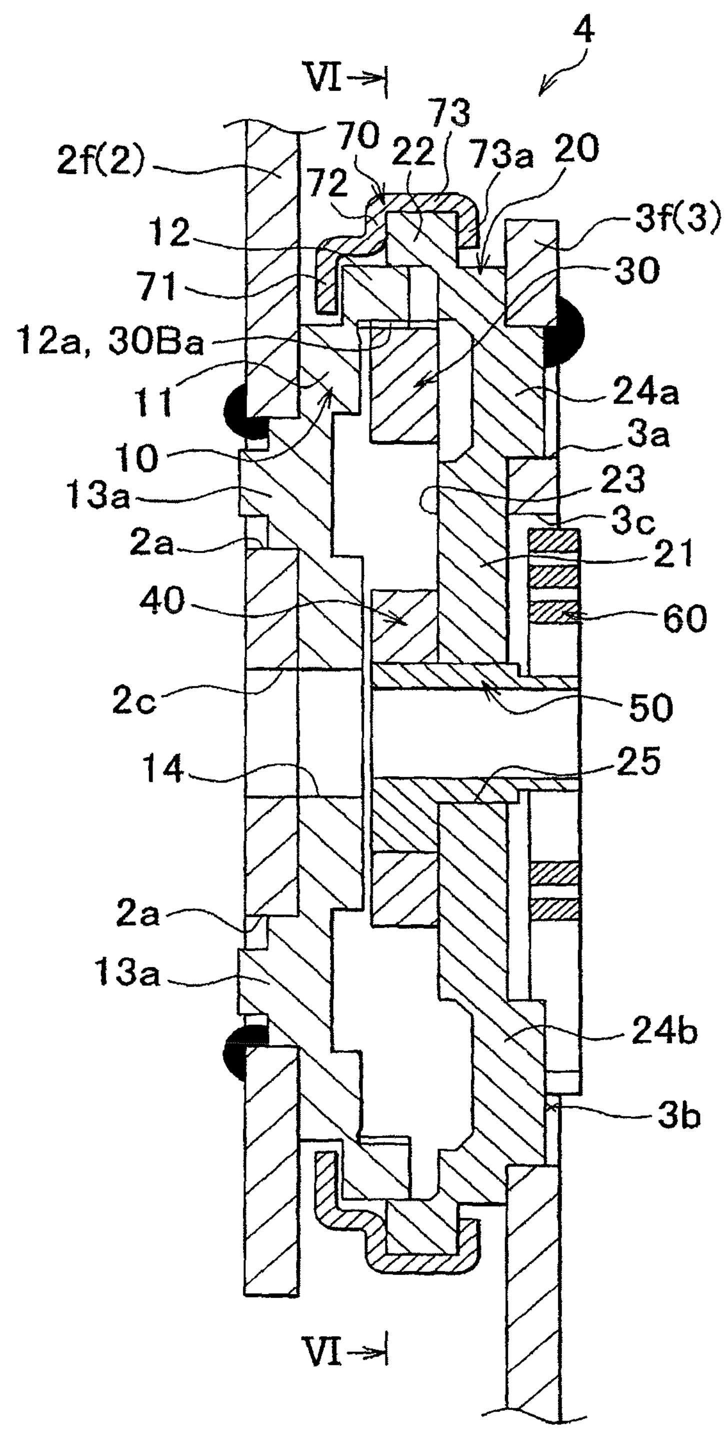
FIG. 5 is a cross-sectional view taken along line V-V in FIG. 4.

Next, the construction of the guide 20 will be described with reference to FIG. 1. The guide 20 is formed in the shape of a disc having a larger outside diameter than the ratchet 10 as described above, and has a disc portion 21, and a cylindrical portion 22 formed on an outer peripheral portion of the disc portion 21. The cylindrical portion 22 protrudes in a cylindrical shape in a thickness direction (or axial direction) in which the guide 20 is mounted onto the ratchet 10. The cylindrical portion 22 is formed by extruding the outer peripheral portion of the disc portion 21 in the thickness direction by half blanking. The inside diameter of the cylindrical portion 22 is slightly larger than the outside diameter of the cylindrical portion 12 of the ratchet 10. As shown in FIG. 5, the cylindrical portion 12 of the ratchet 10 is mounted in the axial direction into the cylindrical portion 22 of the guide 20. More specifically, the ratchet 10 and the guide 20 are assembled together in a condition where the cylindrical portions 12, 22 are loosely fitted on each other, such that the ratchet 10 and the guide 20, which support each other in radial directions, are rotatable relative to each other.

Figures 6A, 6B:
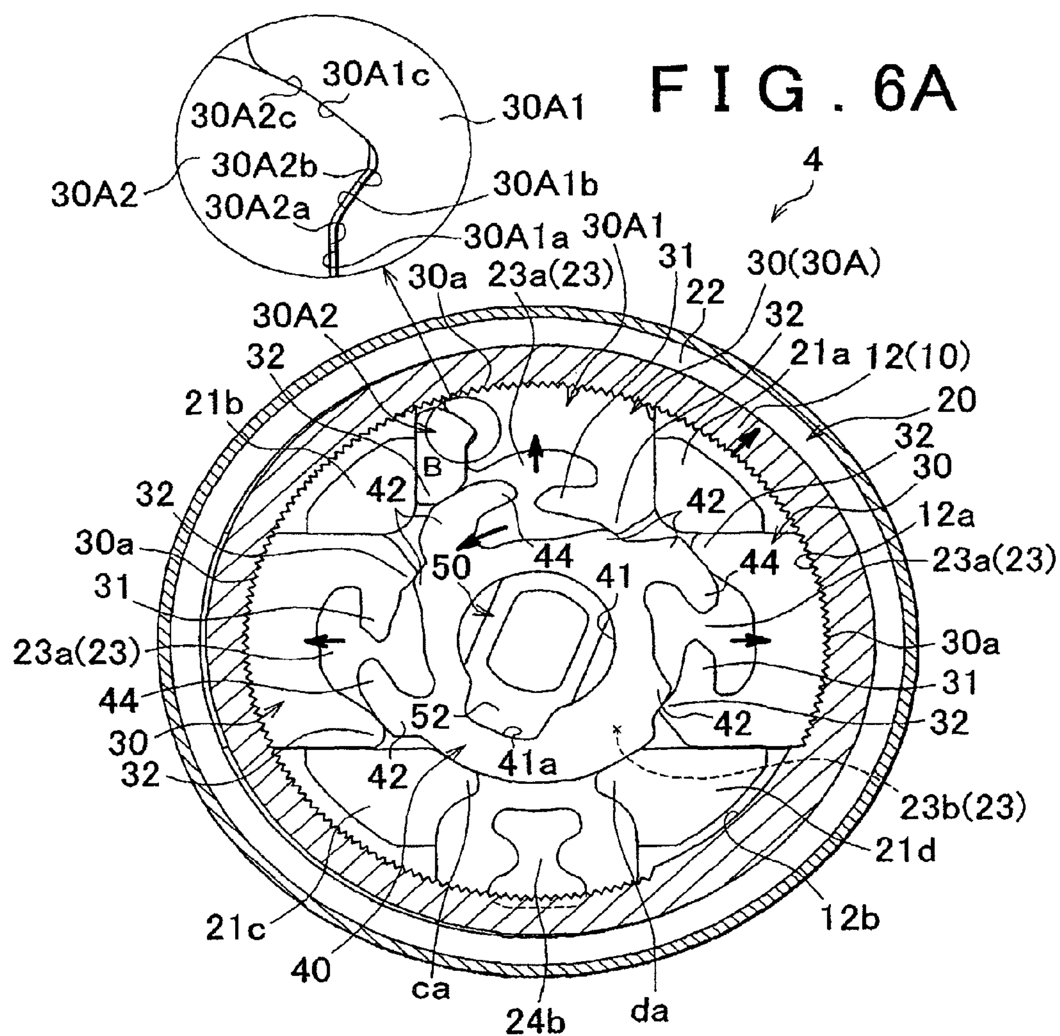
FIG. 6A is a cross-sectional view taken along line VI-VI in FIG. 5, showing a locked state of the reclining device.
FIG. 6B is an enlarged view of a part of FIG. 6A.

The guide 20 has four guide walls 21*a*, 21*b*, 21*c*, 21*d* (which will be referred to as "guide walls 21*a*-21*d*" when appropriate) formed at four circumferential positions on the disc portion 21 thereof. The guide walls 21*a*-21*d* protrude in the thickness direction in which the guide 20 is mounted to the ratchet 10. The guide walls 21*a*-21*d* are formed by extruding parts of the disc portion 21 in the thickness direction by half blanking. As shown in FIG. 6A, the guide walls 21*a*-21*d* are arranged to support the pawls 30 set on the disc portion 21 as described later in the circumferential direction, so that the pawls 30 can move only inward and outward in radial directions. Also, the lower guide walls 21*c*, 21*d* have protrusions ca, da that abut on the outer circumferential surface of the rotating cam 40 set in the central portion of the guide 20. In operation, the protrusions ca, da receive deflected reaction force applied downward in FIG. 6A to the rotating cam 40 when it pushes the pawls 30 outward, and support the rotating can 40 so as to balance forces with which the rotating cam 40 pushes the pawls 30 outward.

Figure 4:
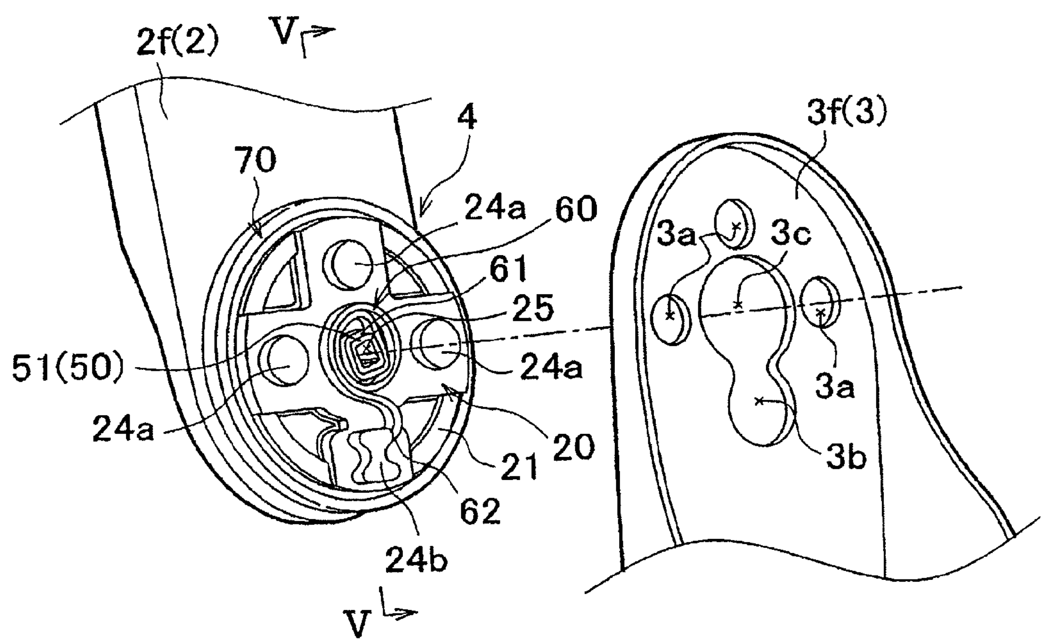
FIG. 4 is a perspective view showing a joining structure of a seat cushion frame and the reclining device.

As shown in FIG. 4, the outer major surface of the disc portion 21 of the guide 20 is joined to and integrally connected with the inner major surface of the seat cushion frame 3E More specifically, the disc portion 21 of the guide 20 is formed with three dowels 24*a* that protrude in a cylindrical shape from the outer major surface thereof, and one spring engaging portion 24*b* that protrudes in an hourglass shape (that is narrow in the middle) for engagement with an outer end 62 of the coil spring 60 (which will be described later). The dowels 24*a* and the spring engaging portion 24*b* are arranged at equal intervals in the circumferential direction, at positions relatively close to the outer periphery of the disc portion 21.

In the other hand, the cushion frame 3*f* has three dowel holes 3*a* in which the above-described dowels 24*a* are respectively are fitted in the axial direction, and one through-hole 3*b* that receives the spring engaging portion 24*b* in the axial direction. The dowel holes 3*a* and the through-hole 3*b* are formed through the cushion frame 3*f* in the thickness direction thereof. By fitting the dowels 24*a* into the respective dowel holes 3*a* of the cushion frame 3*f*, and joining the fitting portions by welding, the guide 20 is firmly and integrally connected to the cushion frame 3*f* (see FIG. 5). As shown in FIG. 1, a through-hole 25 through which the operating shaft 4*c* (see FIG. 2) of the reclining device 4 is inserted is formed in a central portion of the disc portion 21 of the guide 20. Also, a through-hole 3*c* having the same function as the through-hole 25 is formed through the seat cushion frame 3*f*, at a position on the same axis as that of the through-hole 25. The through-hole 3*c* is large in size enough to allow the coil spring 60 to pass or extend therethrough, and communicates with the through-hole 3*b* as described above.

Referring to FIG. 1, a guide groove 23 in the form of a cross-shaped recess is formed on the inner major surface of the disc portion 21 of the guide 20 in the thickness direction thereof. The guide groove 23 is formed by half-blanking the disc portion 21 into a cross shape in the thickness direction, and the above-described guide walls 21*a*-21*d* form walls at four corners of the disc portion 21 where the guide groove 23 is not formed. The guide groove 23 has three groove portions that radially extend from the central portion of the guide 20 upward, leftward and rightward, respectively, and are arranged at intervals of 90 degrees in the circumferential direction. The three groove portions are formed as pawl grooves 23*a* in which the above-described three pawls 30 are received such that the pawls 30 are movable inward and outward in radial directions. The above-mentioned dowels 24*a* are formed on respective regions of the guide 20 in which the pawl grooves 23*a* are formed, so as to protrude from the outer major surface of the guide 20.

As shown in FIG. 6A, the guide groove 23 further includes a groove portion that extends downward from the central portion of the guide 20, and the protrusions ca, da formed on the lower two guide walls 21*c*, 21*d* as described above protrude or extend into the groove portion. Also, the above-mentioned spring engaging portion 24*b* is formed on a region of the guide 20 in which the lower groove portion is formed, so as to protrude from the outer major surface of the guide 20. The guide walls 21*a*-21*d* abut on side faces of the respective pawls 30 received in the pawl grooves 23*a*, and support the respective pawls 30 such that the pawls 30 are movable only inward and outward in radial directions.

When the rotating cam 40 (which will be described later) rotates and pushes the pawls 30 radially outward, the protrusions ca, da formed on the guide walls 21*c*, 21*d* are brought into abutment with lower portions of the outer circumferential surface of the rotating cam 40, so as to receive reaction force applied downward to the rotating cam 40 and support the rotating cam 40. Also, a cam groove 23*b* in which the rotating cam 40 is received is formed in a central portion of the cross-shaped guide groove 34. The size of the cam groove 23*b* is large enough to allow the rotating cam 40 to rotate about its axis within the groove 23*b*.

Next, the construction of the three pawls 30 as described above will be described with reference to FIG. 1. The pawls 30 are set in the respective pawl grooves 23*a* formed at intervals of 90 degrees in the guide 20. More specifically, the pawls 30 are supported by side walls of the pawl grooves 23*a* in the circumferential direction so as to be movable only inward and outward in radial directions. Each of the pawls 30 has an outer circumferential surface formed as an outer tooth face 30*a* having external teeth that engage or mesh with internal teeth of the inner circumferential tooth face 12*a* of the cylindrical portion 12 of the ratchet 10. The outer tooth face 30*a* is curved along the inner circumferential tooth face 12*a* of the cylindrical portion 12 of the ratchet 10.

In operation, the pawls 30 are pushed radially outward by the rotating cam 40 and slide in radial directions, so that the outer tooth faces 30*a* of the pawls 30 are brought into meshing engagement with the inner circumferential tooth face 12*a* of the cylindrical portion 12 of the ratchet 10, as shown in FIG. 6A. As a result, the pawls 30 are pressed against the inner circumferential tooth face 12*a* of the ratchet 10 under the pressing force of the rotating cam 40, and are held in a condition in which the pawls 30 cannot rotate relative to the ratchet 10 in the circumferential direction.

The pawls 30 are supported by the corresponding guide walls 21*a*-21*d* of the guide 20 in the circumferential direction, and therefore, can slide only inward and outward in radial directions, relative to the guide 20. Accordingly, when the external teeth of the pawls 30 mesh with the internal teeth of the ratchet 10, the ratchet 10 is brought into and held in a locked state in which the ratchet 10 is inhibited from rotating relative to the guide 20. As a result, the reclining device 4 is placed in the locked state.

Figure 7:
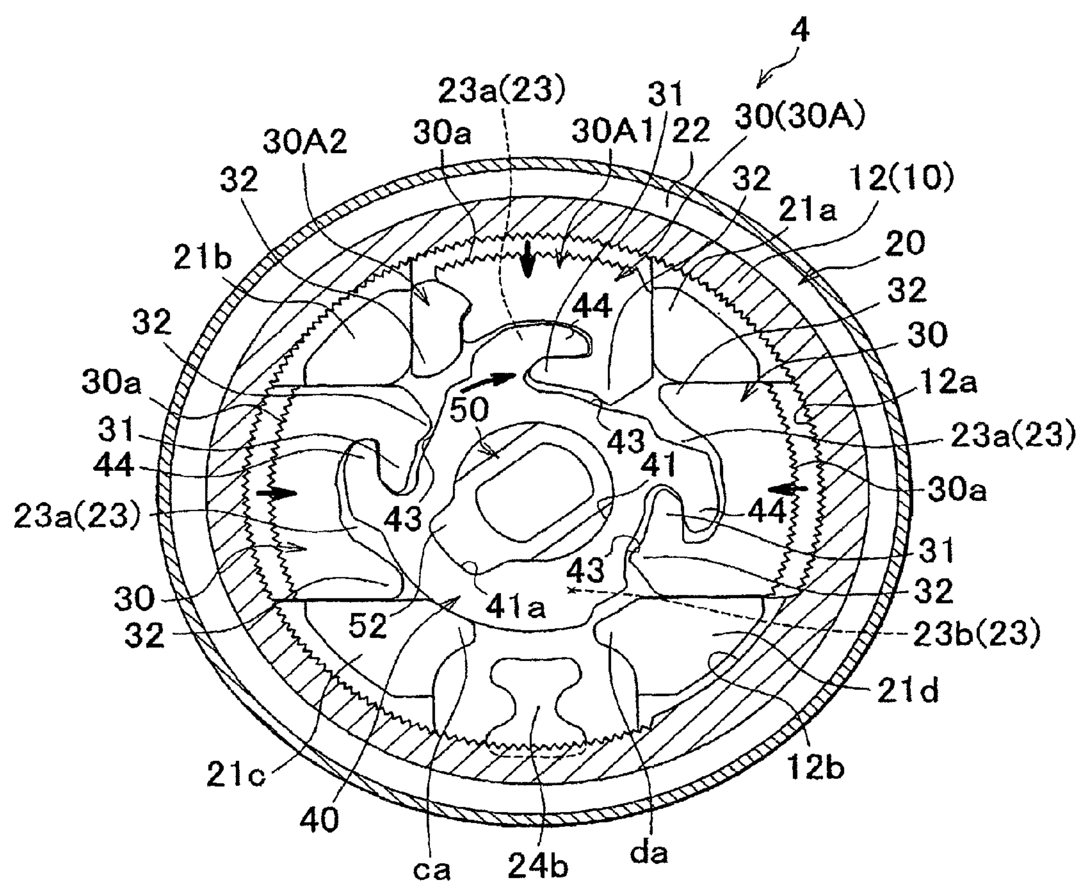
FIG. 7 is a cross-sectional view showing an unlocked state of the reclining device.

The reclining device 4 is released from the locked state when the rotating cam 40 is operated to rotate in the clockwise direction (in FIG. 7), and the pawls 30 are retracted inward in radial directions, to be disengaged from the ratchet 10, as shown in FIG. 7. As shown in FIG. 1, the rotating cam 40 is formed at its outer peripheral portion with a plurality of shoulders 42 and hooks 44 that protrude from the periphery of the rotating cam 40. During rotation of the rotating cam 40 as described above, the shoulders 42 and hooks 44 abutting on the pawls 30 serve to push the pawls 30 radially outward or retract the pawls 30 radially inward.

More specifically, as shown in FIG. 6A, the shoulders 42 are formed so as to protrude like bulges from the outer peripheral portion of the rotating cam 40. In operations, the shoulders 42 push opposite leg portions 32 of the pawls 30 outward in the radial directions, in accordance with a rotational movement of the rotating cam 40 in the counterclockwise direction (a rotational movement from the condition of FIG. 7 to the condition of FIG. 6A), so that the pawls 30 are brought into meshing engagement with the inner circumferential tooth face 12*a* of the ratchet 10. Also, the hooks 44 are formed so as to extend like arms in the clockwise direction from the outer peripheral portion of the rotating cam 40. In operation, the hooks 44 are engaged with respective engaging portions 31 formed in radially inner portions of the pawls 30, in accordance with a rotational movement of the rotating cam 40 in the clockwise direction (a rotational movement from the condition of FIG. 6A to the condition of FIG. 7), so that the pawls 30 are retracted radially inward, to be disengaged from the inner circumferential tooth face 12*a* of the ratchet 10. As the rotating cam 40 rotates in the clockwise direction, the leg portions 32 of the pawls 30 get into corresponding grooves or recesses 43 formed in a radially outer portion of the rotating cam 40, so as to allow the pawls 30 to move inward in radial directions.

As shown in FIG. 6A, the rotating cam 40 is normally biased in the counterclockwise direction, via the hinge cam 50 mounted in the through-hole 41 formed in the central portion of the cam 40, and is thus held in a condition in which the pawls 30 are pushed from inside in radial directions, to be pressed against the inner circumferential tooth face 12*a* of the ratchet 10 for meshing engagement with the tooth face 12*a*. When the hinge cam 50 is rotated in the clockwise direction against the bias force, as shown in FIG. 7, the rotating cam 40 is forced to rotate in the same direction, so as to retract the pawls 30 inward in radial directions and disengage the pawls 30 from the ratchet 10.

When the rotational position of the ratchet 10 relative to the guide 20 is such that the uplifted face 12*b* is located at a position to which any of the pawls 30 is moved, the locking actions of the pawls 30 for engagement with the ratchet 10 are inhibited by the pawl 30 riding on the uplifted face 12*b*, resulting in a failure to place the reclining device 4 in the locked state. More specifically, when any of the pawls 30 rides on the uplifted face 12*b*, rotation of the rotating cam 40 that applies force to the pawls 30 to push the pawls 30 outward is stopped. As a result, the locking actions of the other two pawls 30, 30 are also stopped, and the reclining device 4 is kept in the unlocked state. Thus, in a rotational angle range in which the above-mentioned uplifted face 12*b* interferes with any of the pawls 30, the operation to place the reclining device 4 in the locked state is inhibited, and the reclining device 4 is held in the unlocked state. This rotational angle range is set as the above-mentioned free zone. Also, a rotational angle range in which the uplifted face 12*b* does not interfere with any of the pawls 30, and the pawls 30 can mesh with the inner circumferential tooth face 12*a* of the ratchet 10, is set as the lock zone in which the reclining device 4 is brought back into the locked state.

Among the above-indicated three pawls 30, one pawl 30A placed in the upper pawl groove 23*a* shown in FIG. 1 is divided obliquely into two sections, i.e., a first part 30A1 and a second part 30A2, in the circumferential portion. Thus, the pawl 30A consists of the first part 30A1 and the second part 30A2. The first part 30A1, which constitutes a large part of the pawl 30A, is formed at its outer circumferential surface with the outer tooth face 30*a* having external teeth, and is formed at its radially inner portion with one of the leg portions 32 of the pawl 30A and the engaging portion 31. The second part 30A2 constitutes a part of the pawl 30A which is smaller than the first part 30A1, and has no external teeth formed on its outer circumferential surface. The second part 30A2 is formed with a lateral width (as measured in the circumferential direction) large enough to provide the other leg portion 32. A line that divides the pawl 30A into the first part 30A1 and the second part 30A2 includes a straight, vertical line that divides the pawl 30A in the vertical direction (i.e., a vertical line that divides the pawl 30 A in a direction generally parallel to a radial direction), and a bent line or curve in the shape of letter "V" lying on its side, which divides the pawl 30A at slants or angles.

With the pawl 30A thus divided into the first part 30A1 and the second part 30A2, the left-side face of the first part 30A1 abutting on the second part 30A2 includes a vertical face 30A1 a that faces straight to the left (in a direction perpendicular to the sliding direction of the pawl 30A), an upward inclined face 30A1*b* that faces at an angle to the upper left, and a downward inclined face 30A1*c* that faces at an angle to the lower left, as shown in FIG. 6B. Also, the right-side face of the second part 30A2 abutting on the first part 30A1 includes a vertical face 30A2*a* that faces straight to the right (in a direction perpendicular to the sliding direction of the pawl 30A) to be opposed to the vertical face 30A1*a* of the first part 30A1, a downward inclined face 30A2*b* that faces at an angle to the lower right to be opposed to the upward inclined face 30A1*b* of the first part 30A1, and an upward inclined face 30A2*c* that faces at an angle to the upper right to be opposed to the downward inclined face 30A1*c* of the first part 30A1, as shown in FIG. 6B.

When the rotating cam 40 rotates in the counterclockwise direction, one of the shoulders 42 of the rotating cam 40 pushes the leg portion 32 of the second part 30A2 of the divided pawl 30A radially outward. As a result, the upward inclined face 30A2*c* of the second part 30A2 presses the downward inclined face 30A1*c* of the first part 30A1 in a radially outward, slanting direction, and the first part 30A1 and the second part 30A2 are pushed radially outward while moving (sliding) relative to each other in opposite circumferential directions. As a result, the outer tooth face 30*a* of the first part 30A1 is pressed against the inner circumferential tooth face 12*a* of the ratchet 10 for meshing engagement therewith. As the first part 30A1 and the second part 30A2 that are in contact with each other move relative to each other in opposite circumferential directions, the overall lateral width of the pawl 30A is increased, and the outer side faces of the first and second parts 30A1, 30A2 are pressed against the corresponding guide walls 21*a*, 21*b*. In this condition, the outer tooth face 30*a* of the first part 30A1 is pressed against the inner circumferential tooth face 12*a* of the ratchet 10 so that the external teeth of the tooth face 30*a* mesh with the internal teeth of the tooth face 12*a*. With this arrangement, the pawl 30A is held in meshing engagement with ratchet 10 with no clearances left between the pawl 30A and the guide 20 in the circumferential direction.

In order to ensure ease and efficiency with which the pawls 30 are mounted in the pawl grooves 23*a* and a sufficient sliding capability of the pawls 30 received in the pawl grooves 23*a*, the lateral width of the pawl grooves 23*a* is set to be larger than the lateral width of the pawls 30. With this arrangement, even in a condition where the pawls 30 are in meshing engagement with the inner circumferential tooth face 12*a* of the ratchet 10, the ratchet 10 and the guide 20 may move relative to each other in the circumferential direction, due to the presence of clearances formed in the circumferential direction between the pawls 30 and the walls of the pawl grooves 23*a*.

In this embodiment, however, the above-indicated one pawl 30A divided into two parts increases its lateral width and meshes with the ratchet 10 while filling the circumferential clearances with the guide 20. Therefore, the ratchet 10 and the guide 20 are inhibited from moving relative to each other in the circumferential direction, to be placed in the locked state.

Figure 8:
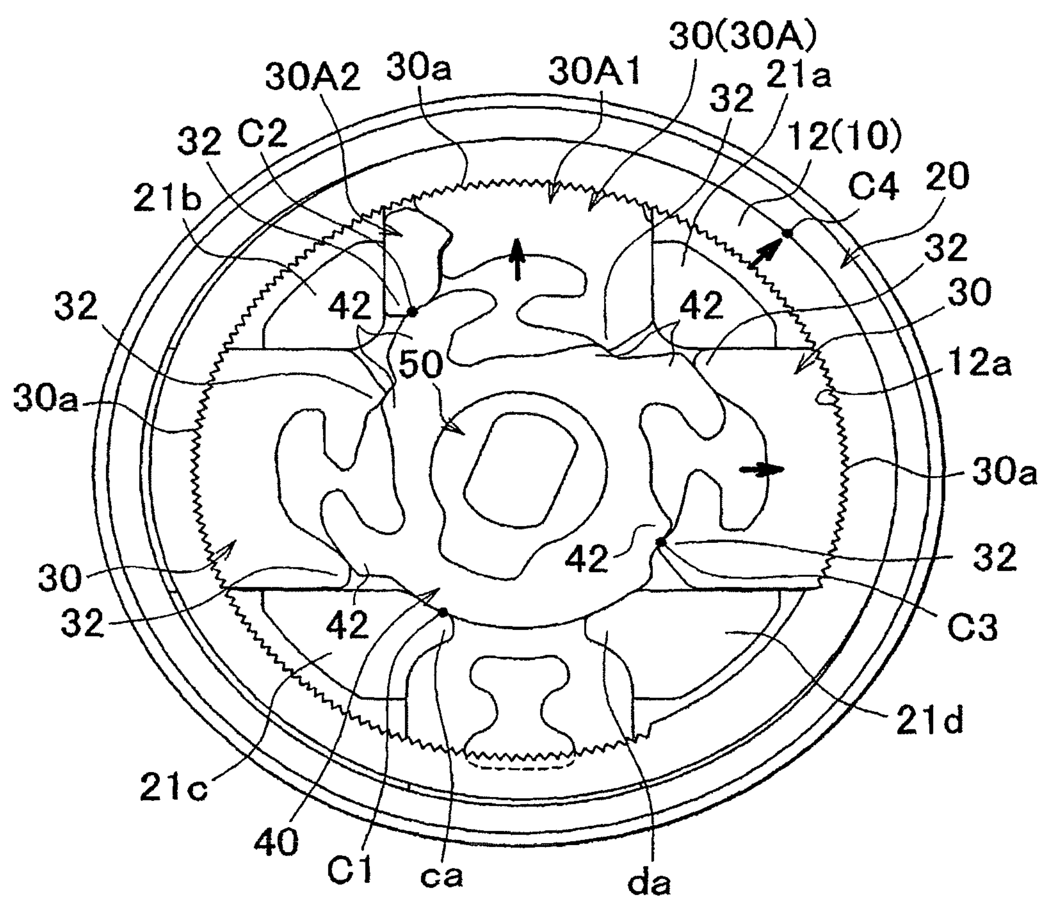
FIG. 8 is a schematic view showing, in particular, contacts between constituent elements of the reclining device when it is placed in the locked state.

As shown in FIG. 8, when the rotating cam 40 is rotated so as to press the pawls 30 against the inner circumferential tooth face 12*a* of the ratchet 10, a part of the outer circumferential surface of the rotating cam 40 rides on the protrusion ca of the lower, left guide wall 21*c* formed on the guide 20, and is pressed against the protrusion ca, so that the rotating cam 40 receives decentering force with which the cam 40 is pushed to the upper left from its central portion, relative to the guide 20 (contact C1). As a result, the rotating cam 40 pushes the upper pawl 30 (pawl 30A) and the right-side pawl 30 outward to their overshoot positions located radially outwardly of the positions at which the pawls 30 are pressed against the inner circumferential tooth face 12*a* of the ratchet 10 (contacts C2, C3). With the two pawls 30 (including the pawl 30A) thus pushed outward to the overshoot positions, the ratchet 10 is pushed radially outward in the right, upward direction, which is the direction of the resultant of the forces with which the pawls 30 are pushed outward, relative to the guide 20, so that the cylindrical portion 12 of the ratchet 10 is pressed against the inner circumferential surface of the cylindrical portion 22 of the guide 20 (contact C4). As a result, a radial clearance set between the cylindrical portion 12 of the ratchet 10 and the cylindrical portion 22 of the guide 20 is eliminated, and the ratchet 10 and the guide 20 are inhibited from moving relative to each other in the radial directions, to be placed in the locked state.

More specifically, the rotating cam 40 pushes the two pawls 30 (including the pawl 30A) to the respective overshoot positions, such that the shoulders 42, 42 formed on upper and right-hand portions of the outer periphery of the rotating cam 40 push the leg portion 32 of the second part 30A2 of the upper pawl 30A and the lower leg portion 32 of the right-side pawl 30, respectively (contact C2, contact C3). In this connection, there are, strictly, slight clearances between the other leg portions 32 of the pawls 30 and the shoulders 42 formed at corresponding positions of the outer periphery of the rotating cam 40, and the shoulders 42 function to support the corresponding pawls 30 from inside in radial directions, so as to prevent the pawls 30 from being disengaged from the ratchet 10. Also, there is, strictly, a slight clearance between the protrusion da formed on the lower, right-side guide wall 21*d* and the outer circumferential surface of the rotating cam 40, and the protrusion da functions to receive reaction force applied to the rotating cam 40 in the downward direction when the pawls 30 receive a load in a direction in which the pawls 30 are disengaged from the ratchet 10.

Thus, the rotating cam 40 is arranged to rotate so as to push two of the pawls 30, i.e., the upper pawl 30 (pawl 30A) and right-side pawl 30 located adjacent to each other in the circumferential direction, to the overshoot positions. Also, the protrusion ca that applies decentering force to the rotating cam 40 in such a direction as to push the pawls 30 outward is formed within a region that is symmetric to a circumferential region between the two pawls 30 (including the pawl 30A), with respect to the center of the guide 20, such that the outer peripheral portion of the rotating cam 40 rides on the protrusion ca. With this arrangement, the ratchet 10 is radially pressed against the guide 20 at two points in the circumferential direction, with high stability.

Next, the construction of the hinge cam 50 operable to rotate the rotating cam 40 will be described. As shown in FIG. 1, the hinge cam 50 is fitted in the through-hole 25 formed in the central portion of the guide 20, and is rotatably supported in the through-hole 25' The hinge cam 50 has an axial portion that protrudes in the axial direction, and an operating protrusion 52 formed on the axial portion so as to protrude from the outer periphery thereof. The hinge cam 50 is set in position such that the axial portion and the operating protrusion 52 are fitted in the through-hole 41 formed through the central portion of the rotating cam 40. More specifically, the hinge cam 50 is set in position such that the operating protrusion 52 is received in an operating hole portion 41*a* formed in a part of a peripheral portion of the through-hole 41 of the rotating cam 40.

The hinge cam 50 is normally biased in the clockwise direction on the paper of FIG. 1, relative to the guide 20, under the bias force of the coil spring 60 engaged with the hinge cam 50 and the guide 20. With this arrangement, the hinge cam 50 is arranged to normally apply rotating bias force to the rotating cam 40 in the same direction (the clockwise direction on the paper of FIG. 1) via the operating protrusion 52. As shown in FIG. 4, the coil spring 60 is mounted on the guide 20 in a preloaded condition in which its inner end 61 engages with a spring engaging portion 51 of the hinge cam 50 which is formed in the shape of a square or rectangular column, and its outer end 62 engages with the spring engaging portion 24*b* of the guide 20. The operating shaft 4*c* as described above and illustrated in FIG. 2 is inserted in the axial direction through the hinge cam 50, to be mounted in the hinge cam 50 such that the operating shaft 4*c* and the hinge cam 50 can rotate as a unit. With this arrangement, when the release lever 5 as described above and illustrated in FIG. 2 is pulled up, the hinge cam 50 is rotated in the counterclockwise direction, against the bias force of the coil spring 60 shown in FIG. 1.

Referring next to FIG. 1, the construction of the outer ring 70 will be described. The outer ring 70 is formed by stamping a thin steel plate into the shape of a ring, and half-blanking a disc portion formed by stamping, in the thickness direction (or axial direction), into a stepped cylindrical shape having ring-shaped first seating portion 71 and second seating portion 72 that face in the axial direction. The first and second seating portions 71, 72, which provide radially inner and outer portions of the outer ring 70, are arranged in the axial direction to form a step therebetween. The outer ring 70 is further formed at its outer peripheral portion with a cylindrical portion 73 that protrudes in a cylindrical shape in the axial direction.

The ratchet 10 and the guide 20 are mounted inside the cylinder of the outer ring 70, such that an axially outer face of the cylindrical portion 12 of the ratchet 10 rests on the first seating portion 71, and an axially outer face of the cylindrical portion 22 of the guide 20 rests on the second seating portion 72, as shown in FIG. 5. In this condition, the cylindrical portion 22 of the guide 20 is covered at its outer periphery with the cylindrical portion 73 of the outer ring 70. After mounting the ratchet 10 and the guide 20 in the outer ring 70, a distal end portion (caulking portion 73*a*) of the cylindrical portion 73 of the outer ring 70, which protrudes axially outward from the cylindrical portion 22 of the guide 20, is bent radially inward; so that the cylindrical portion 22 of the guide 20 is sandwiched in the axial direction between the caulking portion 73*a* and the second seating portion 72. Thus, the outer ring 70 is integrally joined and mounted to the cylindrical portion 22 of the guide 20. The outer ring 70 thus mounted holds the ratchet 10 and the guide 20 in a condition where they are mounted on each other in the axial direction, such that the first seating portion 71 prevents the ratchet 10 from being detached from the guide 20 in the axial direction.

With the reclining device 4 of this embodiment constructed as described above, one (pawl 30A) of the plurality of pawls 30 placed on the guide 20 is divided obliquely into two parts in the circumferential direction. In operation, when the rotating cam 40 pushes the pawl 30A outward, the pawl 30A is brought into meshing engagement with the inner circumferential tooth face 12*a* of the ratchet 10 while eliminating circumferential clearances between the pawl 30A and the guide 20, so that the ratchet 10 and the guide 20 are inhibited from moving relative to each other in the circumferential direction when they are placed in the locked state. Also, when the rotating cam 40 is operated to push the pawls 30 outward, the rotating cam 40 rides on the protrusion ca formed on the guide 20, so that the resulting reaction force causes the two pawls 30 (including the pawl 30A) to be pushed outward to the overshoot positions, and the ratchet 10 is pressed against the guide 20 in radial directions. As a result, the ratchet 10 and the guide 20 are also inhibited from moving relative to each other in the radial directions. Thus, the ratchet 10 and the guide 20 are inhibited from moving relative to each other in the circumferential direction and radial directions when they are placed in the locked state.

The protrusion ca is formed on the guide 20 at a position opposite to a circumferential position between the two pawls 30 (including the pawl 30A) to which the rotating cam 40 applies force for pushing the pawls 30 outward, with the rotating cam 40 interposed between the pawls 30 and the protrusion ca, such that the outer peripheral portion of the rotating cam 40 can ride on the protrusion ca. Thus, since the protrusion ca is formed at a position opposite to a portion of the rotating cam 40 which pushes the two pawls 30 (including the pawl 30A) to the overshoot positions, the protrusion ca can appropriately apply force for pushing the two pawls 30 (including the pawl 30A) to the overshoot positions, to the rotating cam 40.

Figure 9:
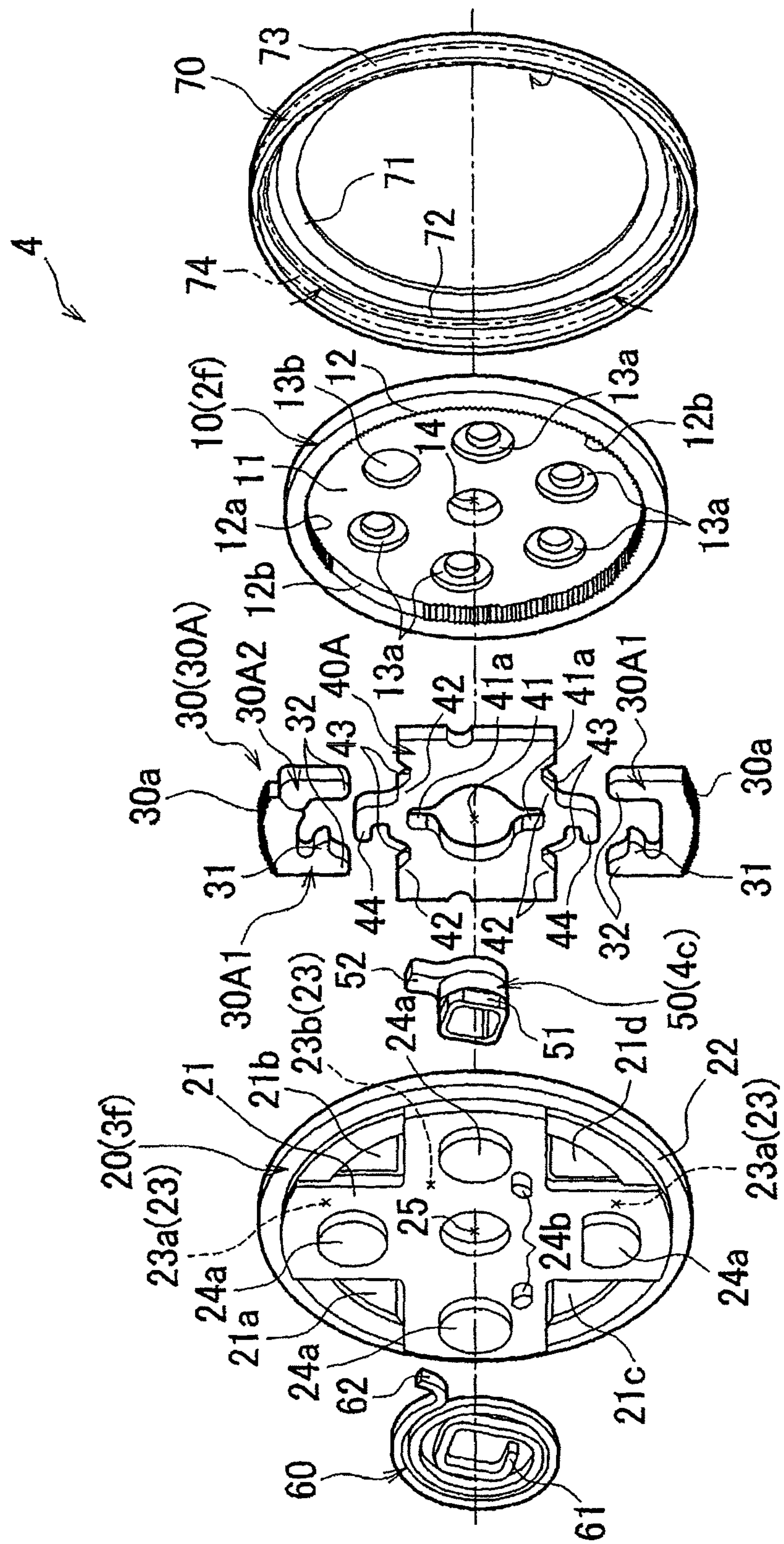
FIG. 9 is an exploded perspective view showing the construction of a reclining device according to a second embodiment of the invention.
Figure 10:
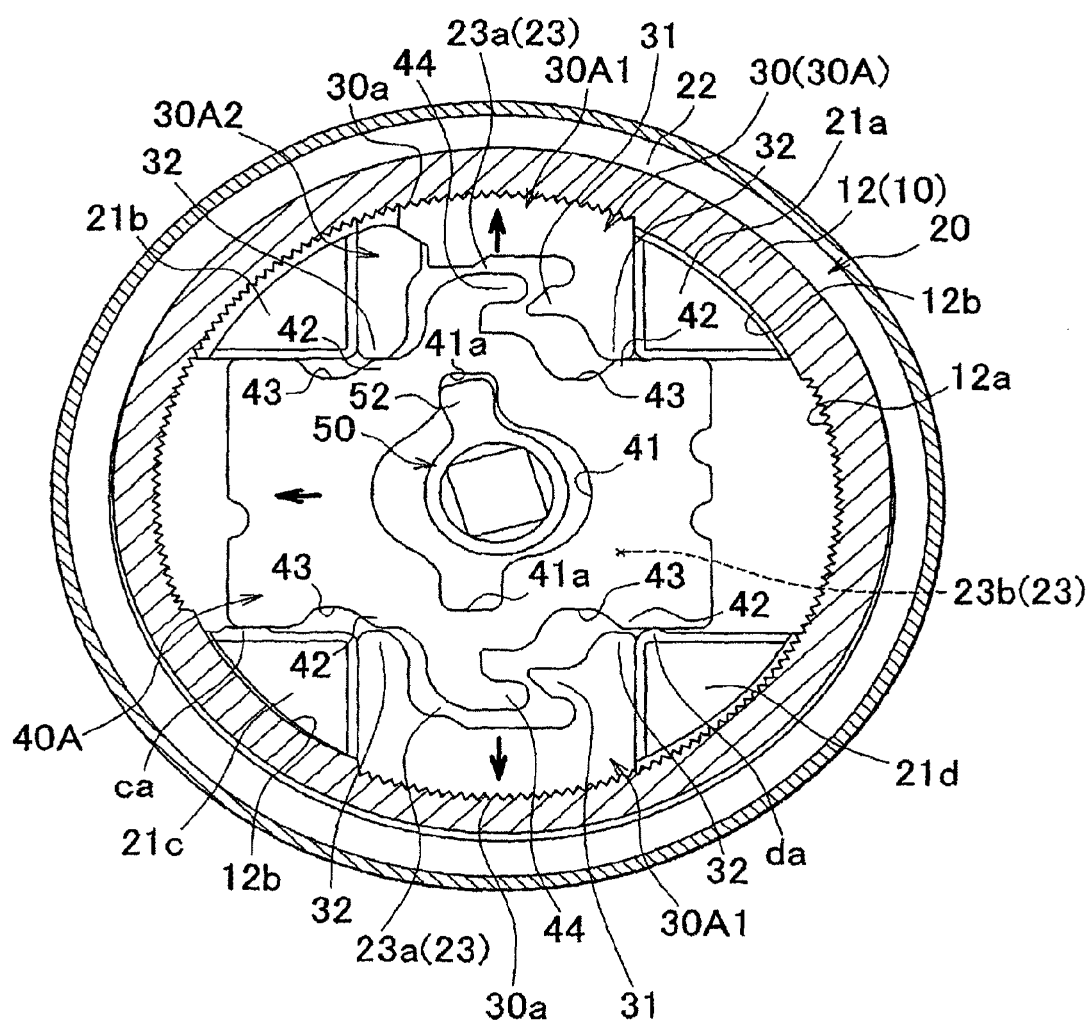
FIG. 10 is a cross-sectional view showing the reclining device of FIG. 9 that is in the locked state.
Figure 11:
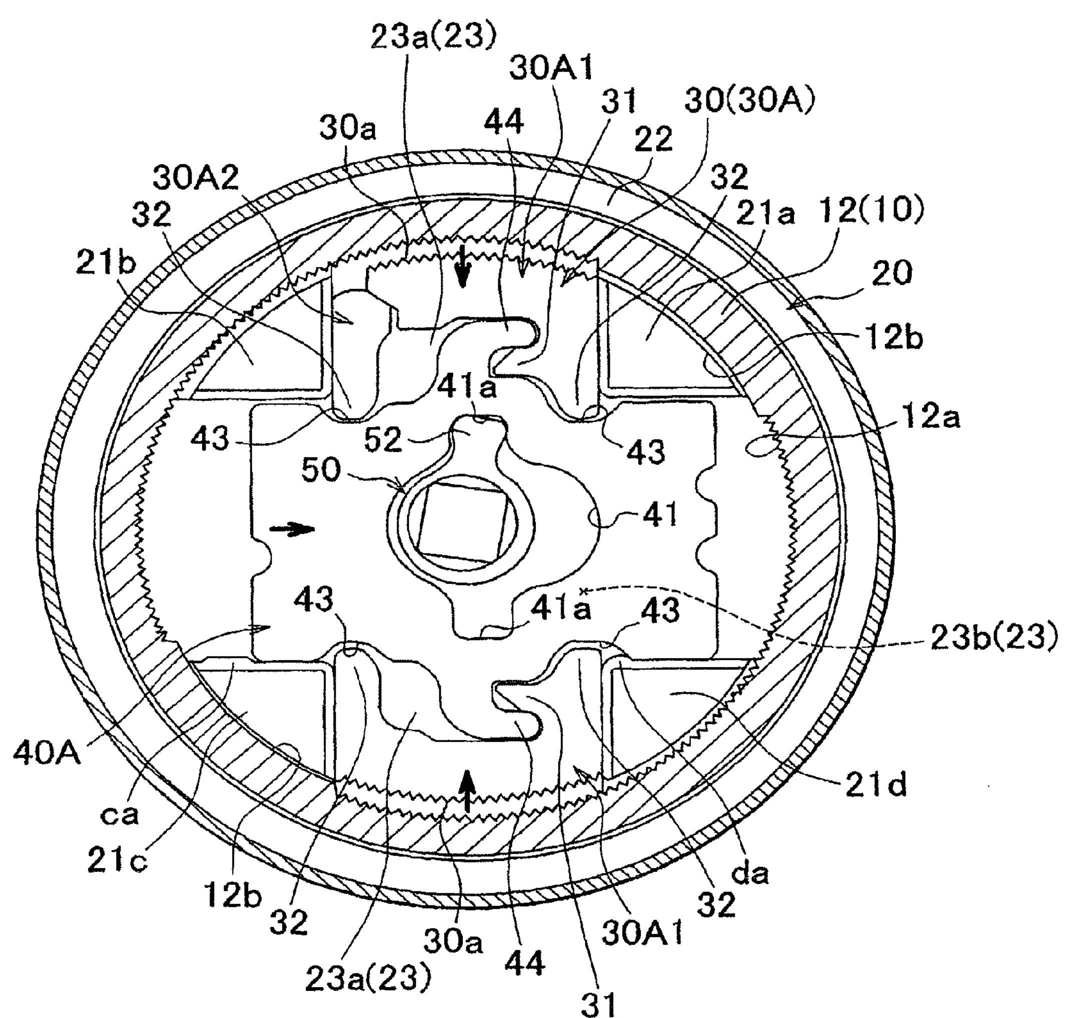
FIG. 11 is a cross-sectional view showing the reclining device of FIG. 9 that is in the unlocked state.

Next, the construction of a reclining device 4 (a pivotal device of a vehicle seat) according to a second embodiment of the invention will be described with reference to FIG. 9 through FIG. 12. In this embodiment, the same reference numerals as used in the first embodiment are assigned to components or parts having substantially the same construction and function as those of the reclining device 4 (lock device) of the first embodiment as described above, and description of these components or parts will not be provided, while different reference numerals are assigned to different components or parts, which will be described in detail. As shown in FIG. 9 through FIG. 11, the reclining device 4 of this embodiment has two pawls 30 mounted on the guide 20, and one of the pawls 30 (pawl 30A) located on the upper side in FIG. 9 is divided obliquely into two parts in the circumferential direction.

A slide earn 40A disposed in a central portion of the guide 20 is operable to move the two pawls 30 (including the pawl 30A) inward and outward in radial directions. In this embodiment, the slide cam 40 functions as the "operating cam" of the invention. The slide cam 40A is supported by the guide walls 21*a*-21*d* formed on the guide 20, such that the cam 40A is movable only in radial directions (the lateral direction in FIG. 10) perpendicular to the radial directions in which the pawls 30 (including the pawl 30A) move. As the slide cam 40A slides in the lateral direction, shoulder portions 42 formed on the upper and lower faces of the slide cam 40 push the pawls 30 (including the pawl 30A) outward in the radial directions, so that the pawls 30 are brought into meshing engagement with the inner circumferential tooth face 12*a* of the ratchet 10, or hooks 44, 44 formed oh the slide cam 40A cause the pawls 30 to be retracted radially inward and disengaged from the ratchet 10.

Figure 12:
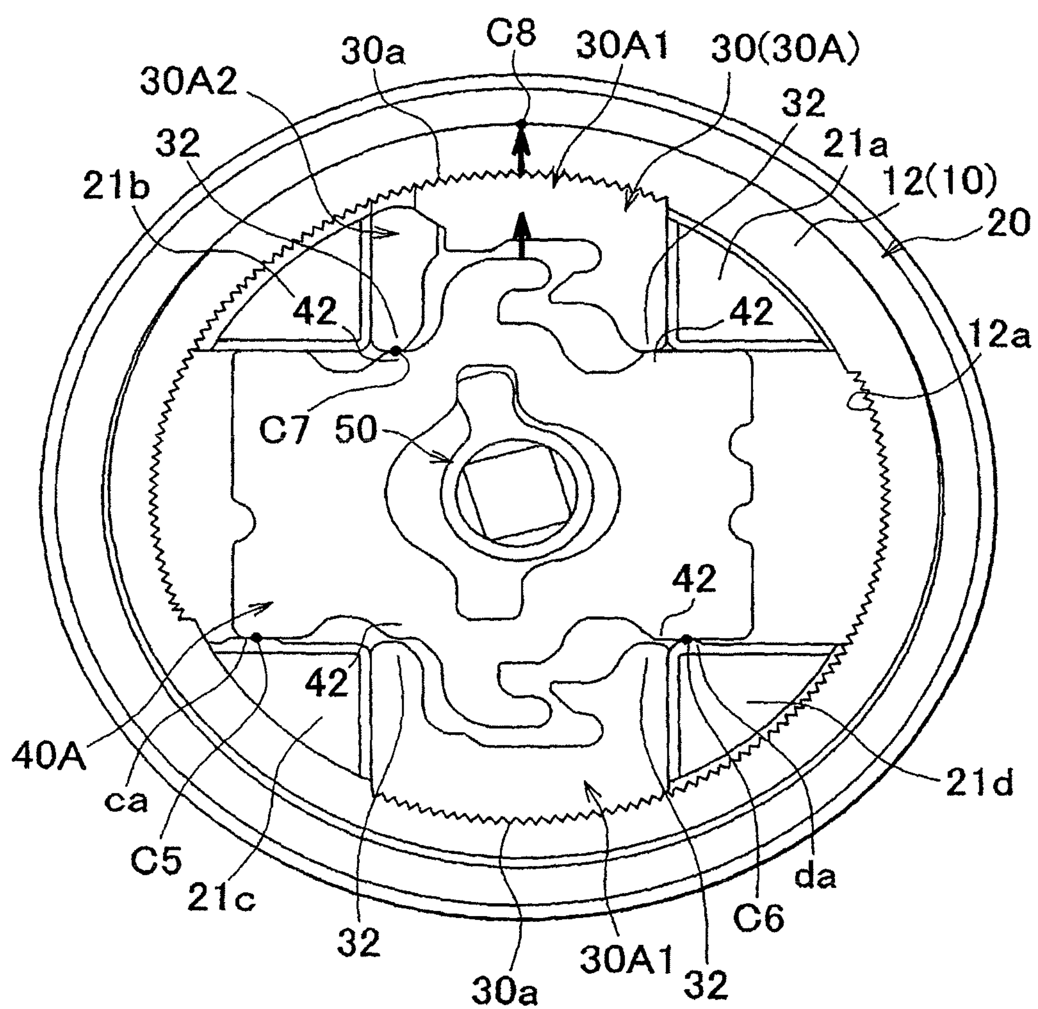
FIG. 12 is a schematic view showing, in particular, contacts between constituent elements of the reclining device when it is placed in the locked state.

As shown in FIG. 12, the lower two guide walls 21*c*, 21*d* located opposite to the divided pawl 30A, among the guide walls 21*a*-21*d*, are respectively formed with protrusions ca, da (contact C5, C6). When the slide cam 40A slides to the left so as to push the pawls 30 (including the pawl 30A) outward, lower surface portions of the slide cam 40 ride on the protrusions ca, da, respectively, so that the protrusions ca, da apply pressing force (decentering force) to the slide cam 40A in the upward direction (toward the divided pawl 30A). With the protrusions ca, da thus formed, as the slide cam 40A slides so as to move the pawls 30 (including the pawl 30A) to locked positions, the slide cam 40A pushes the upper pawl 30A up to an overshoot position located radially outwardly of the position at which the pawl 30A is pressed against the inner circumferential tooth face 12*a* of the ratchet 10 (contact C7). As a result, the cylindrical portion 12 of the ratchet 10 is pressed against the cylindrical portion 22 of the guide 20 (contact C8), whereby the ratchet 10 and the guide 20 are inhibited from moving relative to each other in radial directions, to be placed in the locked state.

As the slide cam 40A slides to the right so as to retract the pawls 30 (including the pawl 30A) radially inward, the protrusion da formed on the lower, right guide wall 21*d* enters a groove portion 43 as a recess formed in the lower surface portion of the slide cam 40A, and ceases to interfere with the slide cam 40A, namely, is disengaged from the slide cam 40A. As the slide cam 40A slides to the right so as to retract the pawls 30 (including the pawl 30) radially inward, the protrusion ca formed on the lower, left guide wall 21*c* ceases to interfere with the slide cam 40A, namely, is disengaged from the slide cam 40.

While the two embodiments of the invention have been illustrated above, the present invention may be embodied in various forms other than the illustrated embodiments. In the illustrated embodiments, the pivotal device of the vehicle seat is used as the reclining device 4 that connects the seat back 2 with the seat cushion 3 such that the reclining angle of the seat back 2 relative to the seat cushion 3 is adjustable. However, the pivotal device of the vehicle seat according to the invention may be used for connecting the seat back with the vehicle floor such that the seat back can be inclined relative to the floor, or may be used for connecting the seat cushion with the vehicle floor such that the seat cushion can be inclined relative to the floor. Also, the pivotal device of the vehicle seat may be used for connecting the main body of the seat with the vehicle floor such that the main body can be rotated relative to the vehicle floor. Also, the pivotal device of the vehicle seat may be used for connecting a so-called ottoman device that brings up and supports the lower legs of the seated person from below the legs, with the seat cushion or the vehicle floor such that the ottoman device can be inclined relative to the seat cushion or the vehicle floor.

While the ratchet 10 is connected to the seat back frame 2*f*, and the guide 20 is connected to the seat cushion frame 3*f* in the illustrated embodiments, the ratchet may be mounted to the seat cushion frame, and the guide may be mounted to the seat back frame. Also, the number of pawls pushed outward to the overshoot positions by the operating cam may be selected as desired provided that the pawls include at least one pawl that is divided obliquely into two parts in the circumferential direction. This is because, when the reclining device is placed in the locked state, the pawl that is divided into two parts is required to be held in a condition in which the pawl is pressed against the internal teeth of the ratchet by the operating cam, so as to eliminate clearances between the pawl and the guide in the circumferential direction.

In the illustrated embodiments, the ratchet 10 and the guide 20 are assembled together so as to radially support each other, such that the cylindrical portions 12, 22 formed in respective outer peripheral portions of the ratchet 10 and the guide 20 so as to protrude in the axial direction are axially fitted on each other to be rotatable relative to each other. However, the guide walls 21*a*-21*d* formed on the disc portion 21 of the guide 20 so as to protrude in the axial direction, as indicated in the illustrated embodiments, may be axially fitted in the cylindrical portion 12 of the ratchet 10 to be rotatable relative to the cylindrical portion 12, such that the guide walls 21*a*-21*d* and the cylindrical portion 12 support each other in radial directions. Also, the protrusions formed on the guide are only required to be formed so as to apply pressing force to the operating cam in such a direction as to decenter the cam, and the protrusions may be formed on the guide at locations other than the guide walls. Thus, the locations of the protrusions are not particularly limited.

What is claimed is:

1. A pivotal device of a vehicle seat having a lock mechanism, comprising:

a disc-shaped ratchet and a guide that are axially fitted on and mounted to each other, such that the ratchet and the guide radially support each other while being rotatable relative to each other;

a plurality of pawls supported by the guide and positioned around a circumferential surface of the guide, each of the pawls having external teeth adapted to mesh with internal teeth formed in a radially outer portion of the ratchet as each of the pawls move outward in radial directions of the guide, so as to inhibit the ratchet and the guide from rotating relative to each other; and an operating cam operable to push the plurality of pawls radially outward, relative to the guide, wherein at least one of the plurality of pawls is divided obliquely into a first part and a second part in a circumferential direction of the guide, the first and second parts being adapted to move in opposite circumferential directions when the operating cam pushes the at least one pawl radially outward, so that the at least one pawl increases a width thereof and is brought into meshing engagement with the internal teeth of the ratchet while eliminating clearances in the circumferential direction between the at least one pawl and the guide, and a protrusion is provided on the guide, and the operating cam is arranged to ride on the protrusion during movement thereof to push the plurality of pawls radially outward, so that reaction force is applied from the protrusion to the at least one pawl so as to push the at least one pawl to an overshoot position located radially outwardly of a position at which the at least one pawl meshes with the internal teeth, and the ratchet is pressed radially against the guide.

2. The pivotal device of the vehicle seat according to claim 1, wherein the protrusion is provided on the guide at a position opposite to a circumferential location of the at least one pawl, with the operating cam interposed between the at least one pawl and the protrusion, so that an outer peripheral portion of the operating cam rides on the protrusion during movement of the operating cam.

3. The pivotal device of the vehicle seat according to claim 1, wherein the operating cam is supported on a central portion of the guide to be rotatable about an axis thereof, and is arranged to rotate so as to push the plurality of pawls radially outward, the plurality of pawls include two pawls located adjacent to each other in the circumferential direction and adapted to be pushed outward to the overshoot positions by the operating cam, and the protrusion is provided on the guide within a region that is symmetric to a circumferential region between the two pawls with respect to the central portion of the guide, so that an outer peripheral portion of the operating cam rides on the protrusion during movement of the operating cam.

4. The pivotal device of the vehicle seat according to claim 1, wherein the first part is larger than the second part, and the at least one pawl is divided into the first part and the second part along a line that includes a vertical line that extends in a direction substantially parallel to a radial direction of the guide, and a bent line having a generally V shape as viewed in a direction substantially perpendicular to the radial direction.

* * * * *